(12) United States Patent
Imamura

(10) Patent No.: US 7,365,770 B2
(45) Date of Patent: Apr. 29, 2008

(54) VIDEO SIGNAL LEVEL DISPLAY DEVICE

(75) Inventor: Genichi Imamura, Kanagawa-ken (JP)

(73) Assignee: Leader Electronics Corporation, Yokohama-shi, Kanagawa-ken (JP)

( * ) Notice: Subject to any disclaimer, the term of this patent is extended or adjusted under 35 U.S.C. 154(b) by 705 days.

(21) Appl. No.: 11/001,043

(22) Filed: Dec. 2, 2004

(65) Prior Publication Data

US 2005/0140690 A1 Jun. 30, 2005

(30) Foreign Application Priority Data

Dec. 24, 2003 (JP) ............................. 2003-426331

(51) Int. Cl.
*H04N 17/02* (2006.01)
(52) U.S. Cl. ..................................... 348/191; 348/659
(58) Field of Classification Search ................ 348/191, 348/189, 659–661; 345/589–591; 382/167; *H04N 17/02*
See application file for complete search history.

(56) References Cited

U.S. PATENT DOCUMENTS 4,707,727 A 11/1987 Penney
5,307,087 A 4/1994 Baker
7,176,904 B2* 2/2007 Satoh ......................... 345/173
7,218,358 B2* 5/2007 Chen et al. .................. 348/191

FOREIGN PATENT DOCUMENTS

JP 62-239785 10/1987
JP 06-261345 9/1994

* cited by examiner

*Primary Examiner*—Sherrie Hsia
(74) *Attorney, Agent, or Firm*—Fish & Richardson P.C.

(57) ABSTRACT

The present invention reduces a burden on an observer. A video signal level display device includes setting sections (24, 25, 26) for setting maximum effective values corresponding to R, G, and B components, respectively, of an RGB component signal, calculating sections (21, 22, 23) for calculating respective coordinates of the R, G, and B components so that the maximum effective values concentrate at one point, generating section (27) for generating straight scale data corresponding to the R, G, and B components, respectively, so that the maximum effective values concentrate at one point, and display section (29) for displaying the respective coordinates of the R, G, and B components and the respective straight scale date (61, 62, 63, 71, 72, 73, 74, 75, 75) on the R, G, and B components.

14 Claims, 14 Drawing Sheets

VIDEO SIGNAL LEVEL DISPLAY DEVICE

BACKGROUND OF THE INVENTION

The present invention relates to a device that displays the level of a video signal in order to monitor the video signal.

For example, Patent Document 1, shown below, discloses a conventional device that displays the level of a video signal in order to monitor the video signal. FIG. 1 shows a display method employed in the device disclosed in Patent Document 1 and known as a diamond display. As shown in FIG. 1, an upper part of the diamond display indicates a first vector (G+B, −G+B) corresponding to G (green) and B (blue) components of an RGB component signal. A lower part of the diamond display indicates a second vector (−G−R, −G+R) corresponding to the G (green) component and an R (red) component of the RGB component signal. When the first and second vectors are displayed outside a first area 11 and a second area 12 bounded by dotted lines, an observer can recognize that the level of the RGB component exceeds a predetermined value or is in a gammut error state.

[Patent Document 1] Japanese Patent Laid-Open No. 6-261345

The observer must read the state of the RGB (how the level of each of the R, G, and B components approaches or exceeds a predetermined value) from the diamond display (first and second vectors).

Further, for example, if the RGB component signal contains a natural image, the observer must pay attention to both upper and lower parts (the first area 11 and second area 12, bounded by dotted lines) of the diamond display when observing which color in the natural image is in the gammut error state. In addition, the diamond display corresponding to a natural image appears blurred, like clouds.

SUMMARY OF THE INVENTION

It is an object of the present invention to reduce a burden on an observer.

Those skilled in the art can easily understand the other objects of the present invention with reference to the specification and drawings.

A video signal level display device according to the present invention comprises means (24, 25, 26) for setting maximum effective values corresponding to R, G, and B components, respectively, of an RGB component signal, means (21, 22, 23) for calculating respective coordinates of the R, G, and B components so that the maximum effective values concentrate at one point, and means (29) for displaying the respective coordinates of the R, G, and B components.

The video signal level display device can further comprise means (27) for generating straight scale data corresponding to the R, G, and B components, respectively, so that the maximum effective values concentrate at one point. The means (29) for setting the coordinates can further display respective straight scale data. The means (24, 25, 26) for setting the maximum effective values can further set minimum effective values corresponding to the R, G, and B components, respectively.

A video signal level display device according to the present invention comprises means (132) for converting Y, Pr, and Pb components of a Y/color difference component signal into R, G, and B components of an RGB component signal, means (24, 25, 26) for setting maximum and minimum effective values corresponding to the R, G, and B components, respectively, of the RGB component signal, means (21, 22, 23) for calculating respective coordinates of the R, G, and B components so that the maximum effective values concentrate at one point, and means (29) for displaying the coordinates of the R, G, and B components so that a component belonging to a range between the minimum effective value and the maximum effective value is distinguished from a component belonging to a different range.

A video signal level display device according to the present invention comprises means (24, 25, 26) for setting maximum effective values corresponding to R, G, and B components, respectively, of an RGB component signal, means (21, 22, 23) for calculating respective coordinates of the R, G, and B components, means (27) for generating straight scale data corresponding to the R, G, and B components, respectively, and means (29) for displaying the respective coordinates and straight scale data of the R, G, and B components.

DETAILED DESCRIPTION OF THE INVENTION

Figure 1:
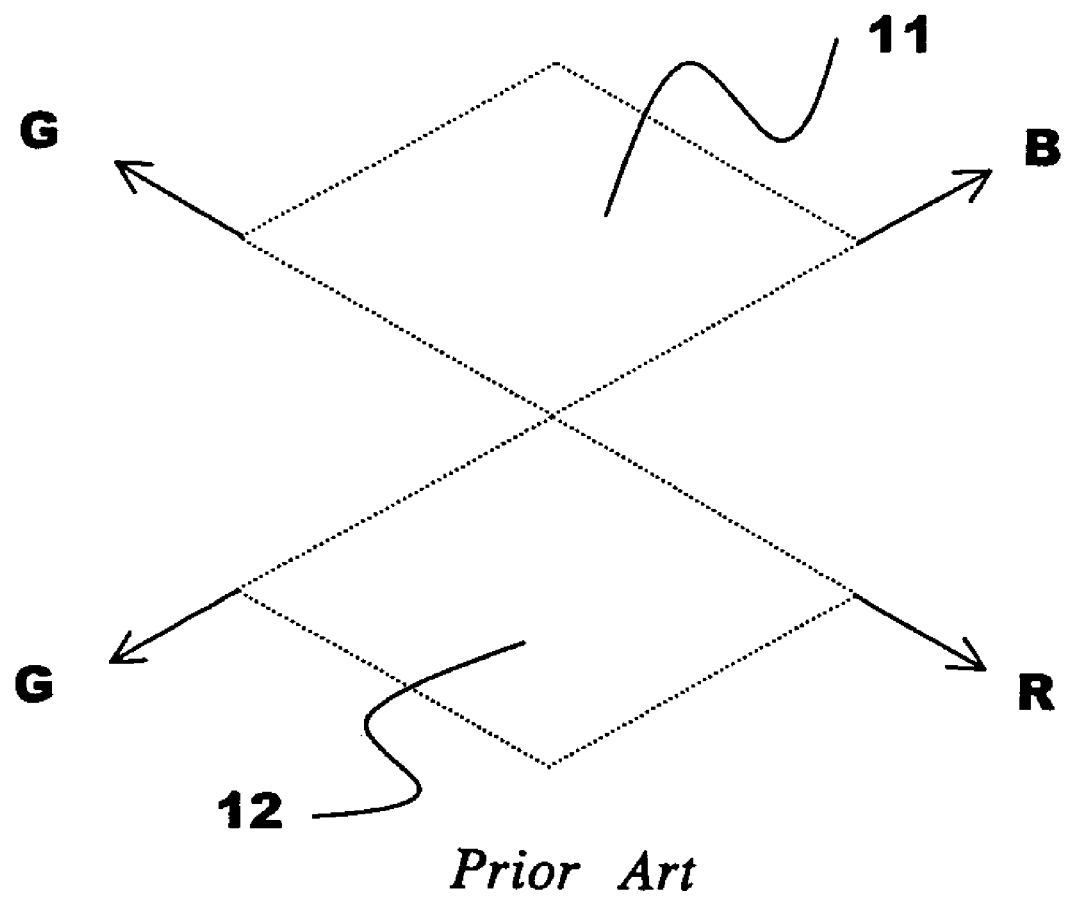
FIG. 1 is a diagram illustrating a conventional method of displaying a video signal level.
Figure 2:
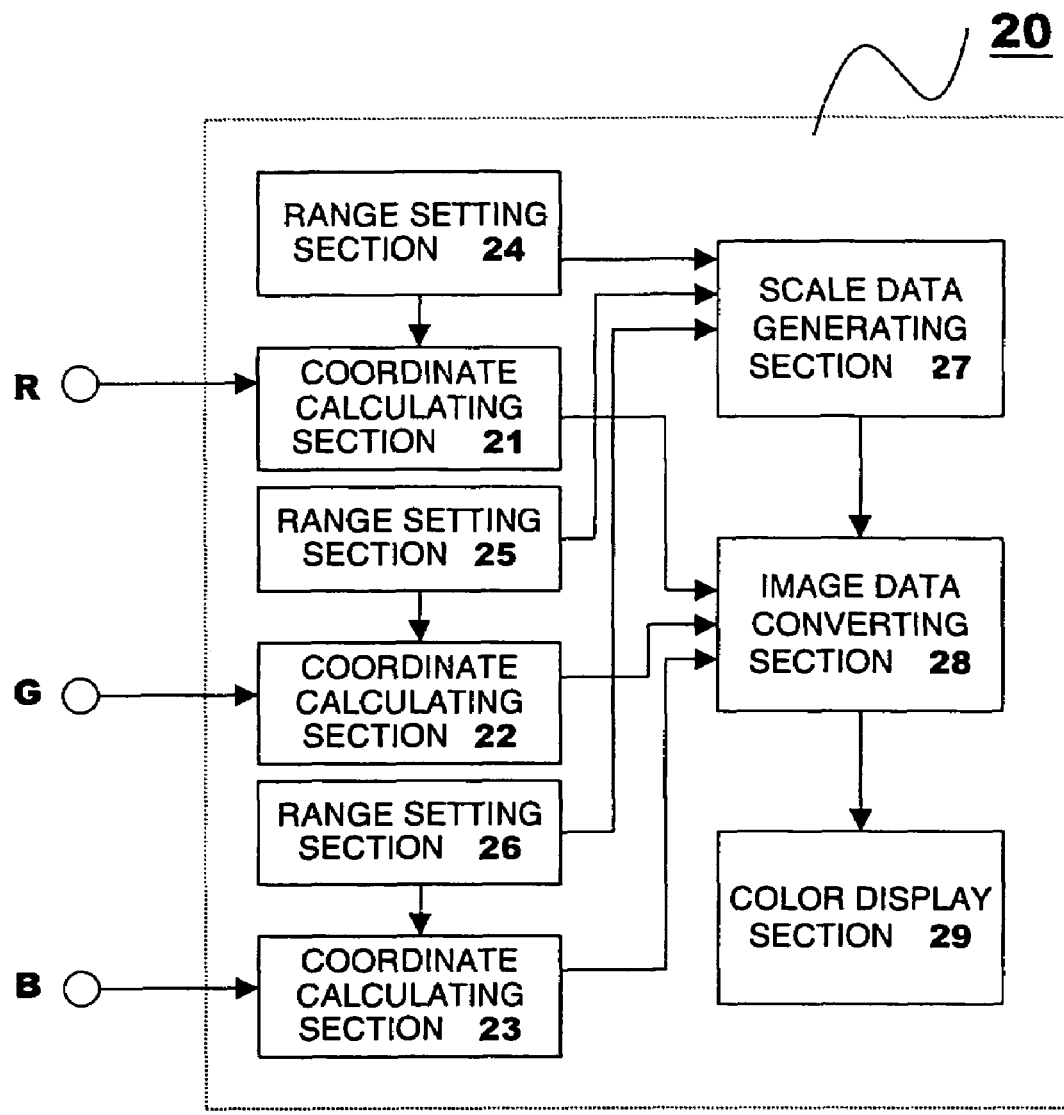
FIG. 2 is a block diagram of a video signal level display device according to the present invention.

FIG. 2 is a block diagram of a video signal level display device 20 according to the present invention. As shown in FIG. 2, the video signal level display device 20 comprises coordinate calculating sections 21, 22, and 26 that calculate respective coordinates corresponding to R, G, and B components of an RGB component signal. The video signal level display device 20 further comprises range setting sections 24, 25, and 26 that set respective effective ranges corresponding to the R, G, and B components of the RGB component signal.

The range setting section 24 has a minimum effective value $R_{MIN}$ (for example, 0 V) and a maximum effective value $R_{MAX}$ (for example, 0.7 V) for the R component, and an upper limit value $R_{U\_LIMIT}$ (for example, 1 V) and a lower limit value $R_{L\_LIMIT}$ (for example, −0.1 V) for the R component. Likewise, the range setting section 25 has a minimum effective value $G_{MIN}$ (for example, 0 V) and a maximum effective value $G_{MAX}$ (for example, 0.7 V) for the G component, and an upper limit value $G_{U\_LIMIT}$ (for example, 1 V) and a lower limit value $G_{L\_LIMIT}$ (for example, −0.1 V) for the G component. Further, the range setting section 26 has a minimum effective value $B_{MIN}$ (for example, 0 V) and a maximum effective value $B_{MAX}$ (for example, 0.7 V) for the B component, and an upper limit value $B_{U\_LIMIT}$ (for example, 1 V) and a lower limit value $B_{L\_LIMIT}$ (for example, −0.1 V) for the B component.

Figure 3:
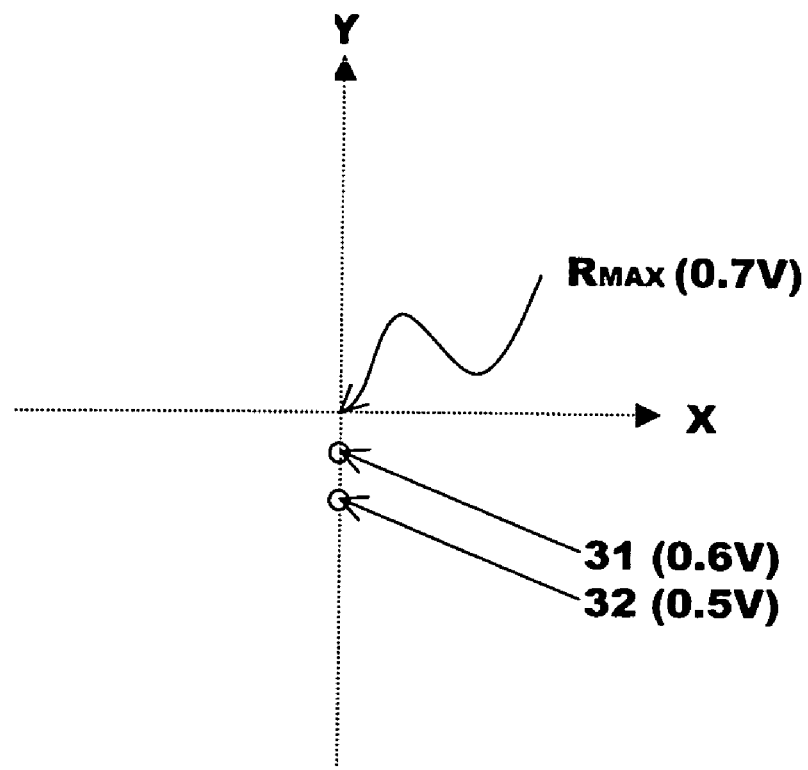
FIG. 3 is a diagram illustrating the coordinates of an R component.
Figure 3:
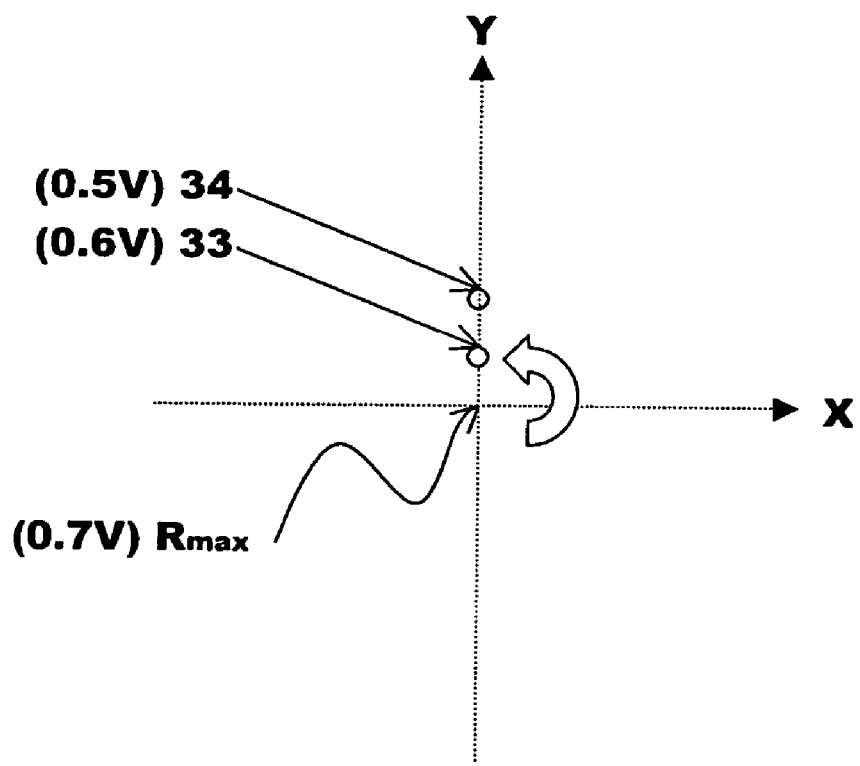

FIG. 3 is a diagram illustrating the coordinates calculated by the coordinate calculating section 21. First, the coordinate calculating section 21 sets the maximum effective value $R_{MAX}$ from the range setting section 24 as an origin. The coordinate calculating section 21 then calculates $(X_R, Y_R) = (0, R−R_{MAX})$ as the coordinates of the R component. For $R_{MAX}=0.7$ V and R=0.6 V, the coordinates of the R component are $(X_R, Y_R)=(0, −0.1)$ as shown by an arrow 31 in FIG. 3. For R=0.5 V, the coordinates of the R component are $(X_R, Y_R)=(0, −0.2)$ as shown by an arrow 32 in FIG. 3.

Then, the coordinate calculating section 21 calculates $(X_R, Y_R)=(0 \times \cos(180))+(R−R_{MAX}) \times (−\sin(180)), 0 \times \sin(180)+(R−R_{MAX}) \times \cos(180))$ so as to rotate the coordinates of the R component through 180°. For $R_{MAX}=0.7$ V and R=0.6 V, the coordinates of the R component are $(X_R, Y_R)=(0, +0.1)$ as shown by an arrow 33 in FIG. 3. For R=0.5 V, the coordinates of the R component are $(X_R, Y_R)=(0, +0.2)$ as shown by an arrow 34 in FIG. 3. When the coordinates are thus converted, the value of the R component increases downward.

Figure 4:
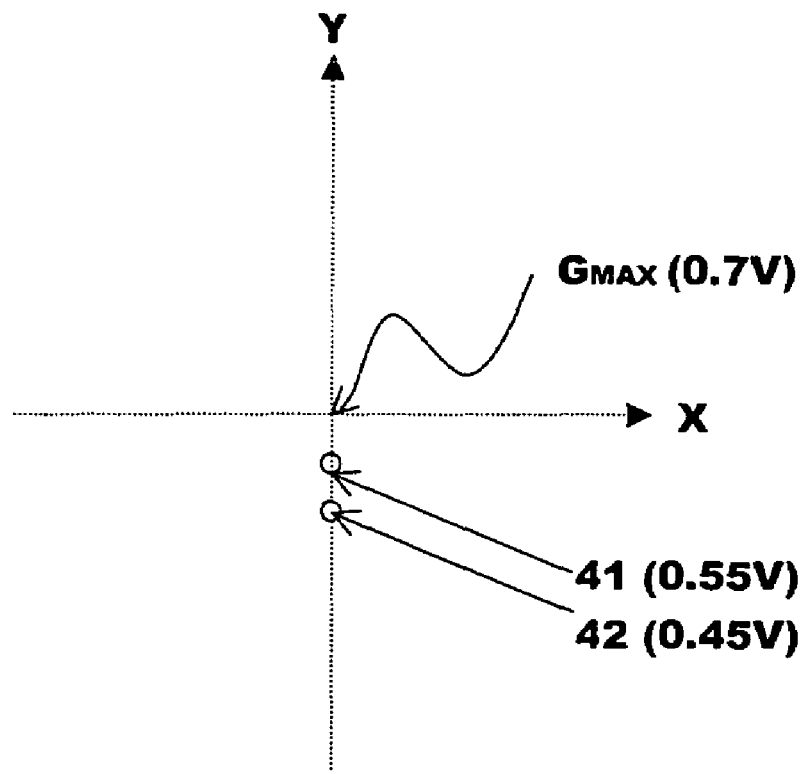
FIG. 4 is a diagram illustrating the coordinates of a G component.
Figure 4:
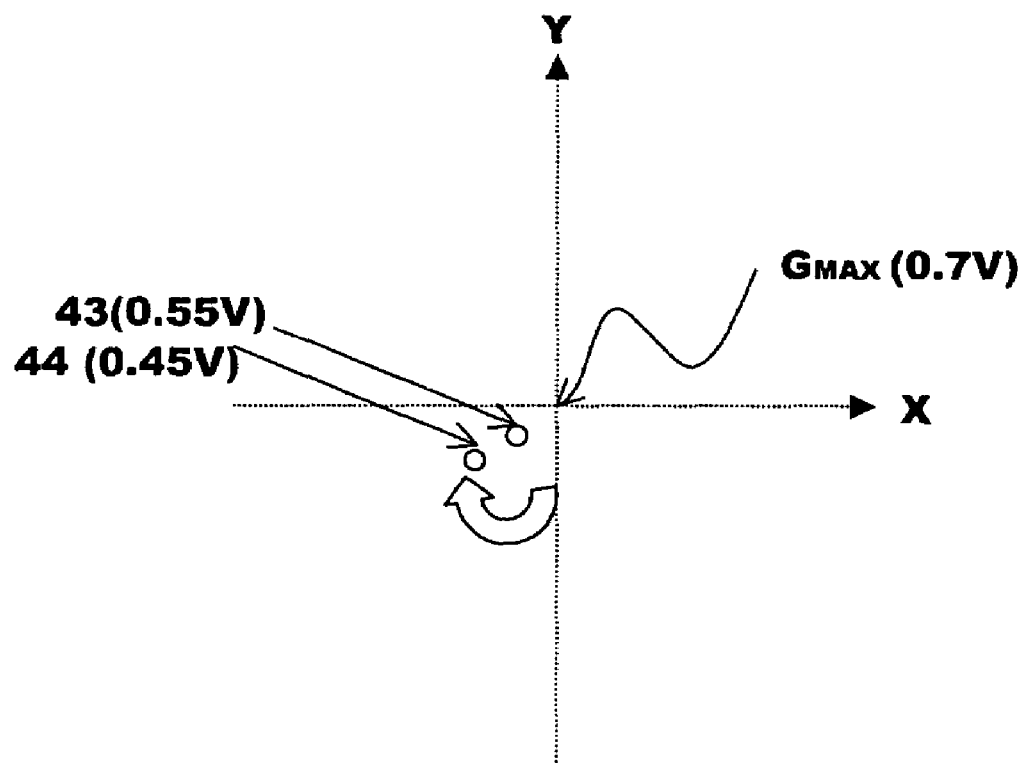

FIG. 4 is a diagram illustrating the coordinates calculated by the coordinate calculating section 22. First, the coordinate calculating section 22 sets the maximum effective value $G_{MAX}$ from the range setting section 25 as the origin. The coordinate calculating section 22 then calculates $(X_G, Y_G) = (0, G−G_{MAX})$ as the coordinates of the G component. For G=0.7 V and G=0.55 V, the coordinates of the G component are $(X_G, Y_G)=(0, −0.15)$ as shown by an arrow 41 in FIG. 4. For G=0.45 V, the coordinates of the G component are $(X_G, Y_G)=(0, −0.25)$ as shown by an arrow 42 in FIG. 4.

Then, the coordinate calculating section 22 calculates $(X_G, Y_G)=(0 \times \cos(−60)+(G−G_{MAX}) \times (−\sin(−60)), 0 \times \sin(−60)+(G−G_{MAX}) \times \cos(−60))$ so as to rotate the coordinates of the G component through −60°. For $G_{MAX}=0.7$ V and G=0.55 V, the coordinates of the G component are $(X_G, Y_G)=(−0.15 \times (\sqrt{3})/2, 0.15/2)$ as shown by an arrow 43 in FIG. 4. For G=0.45 V, the coordinates of the G component are $(X_G, Y_G)=(−0.25 \times (\sqrt{3})/2, −0.25/2)$ as shown by an arrow 44 in FIG. 4. When the coordinates are thus converted, the value of the G component increases from the lower left to the upper right.

Figure 5:
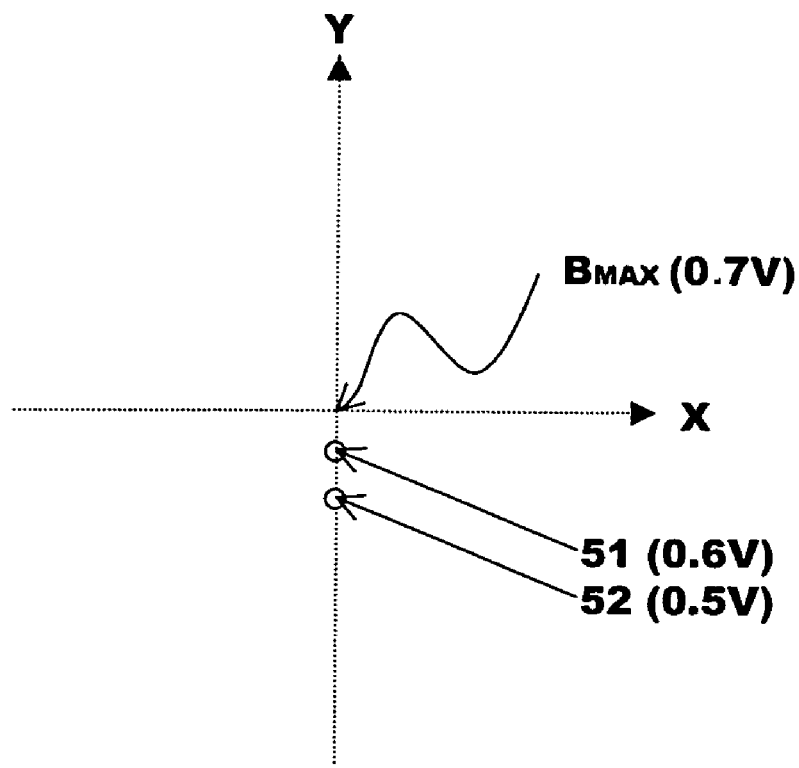
FIG. 5 is a diagram illustrating the coordinates of a B component.
Figure 5:
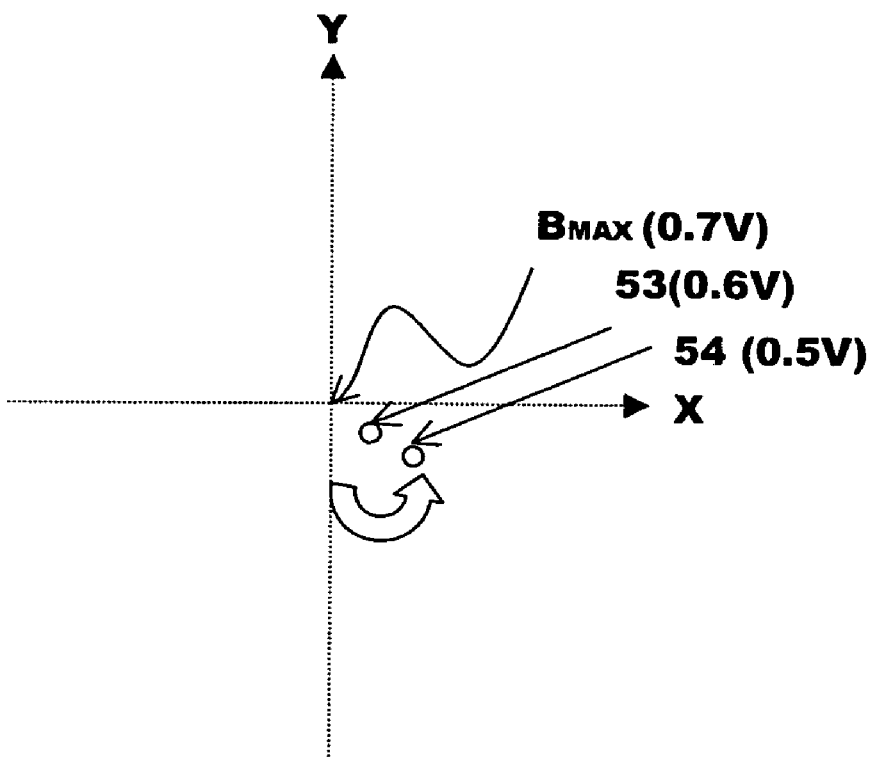

FIG. 5 is a diagram illustrating the coordinates calculated by the coordinate calculating section 23. First, the coordinate calculating section 23 sets the maximum effective value $B_{MAX}$ from the range setting section 26 as an origin. The coordinate calculating section 23 then calculates $(X_B, Y_B)= (0, B−B_{MAX})$ as the coordinates of the B component. For B=0.7 V and B=0.6 V, the coordinates of the B component are $(X_B, Y_B)=(0, −0.1)$ as shown by an arrow 51 in FIG. 5. For B=0.5 V, the coordinates of the B component are $(X_B, Y_B)=(0, −0.2)$ as shown by an arrow 52 in FIG. 5.

Then, the coordinate calculating section 23 calculates $(X_B, Y_B)=(0 \times \cos(60)+(B−B_{MAX}) \times (−\sin(60)), 0 \times \sin(60)+(B−B_{MAX}) \times \cos(60))$ so as to rotate the coordinates of the G component through +60°. For $B_{MAX}=0.7$ V and B=0.6 V, the coordinates of the B component are $(X_B, Y_B)=(−0.1 \times (\sqrt{3})/2, −0.1/2)$ as shown by an arrow 53 in FIG. 5. For B=0.5 V, the coordinates of the B component are $(X_B, Y_B)=(−0.2 \times (\sqrt{3})/2, −0.2/2)$ as shown by an arrow 54 in FIG. 5. When the coordinates are thus converted, the value of the B component increases from the lower right to the upper left.

Figure 6:
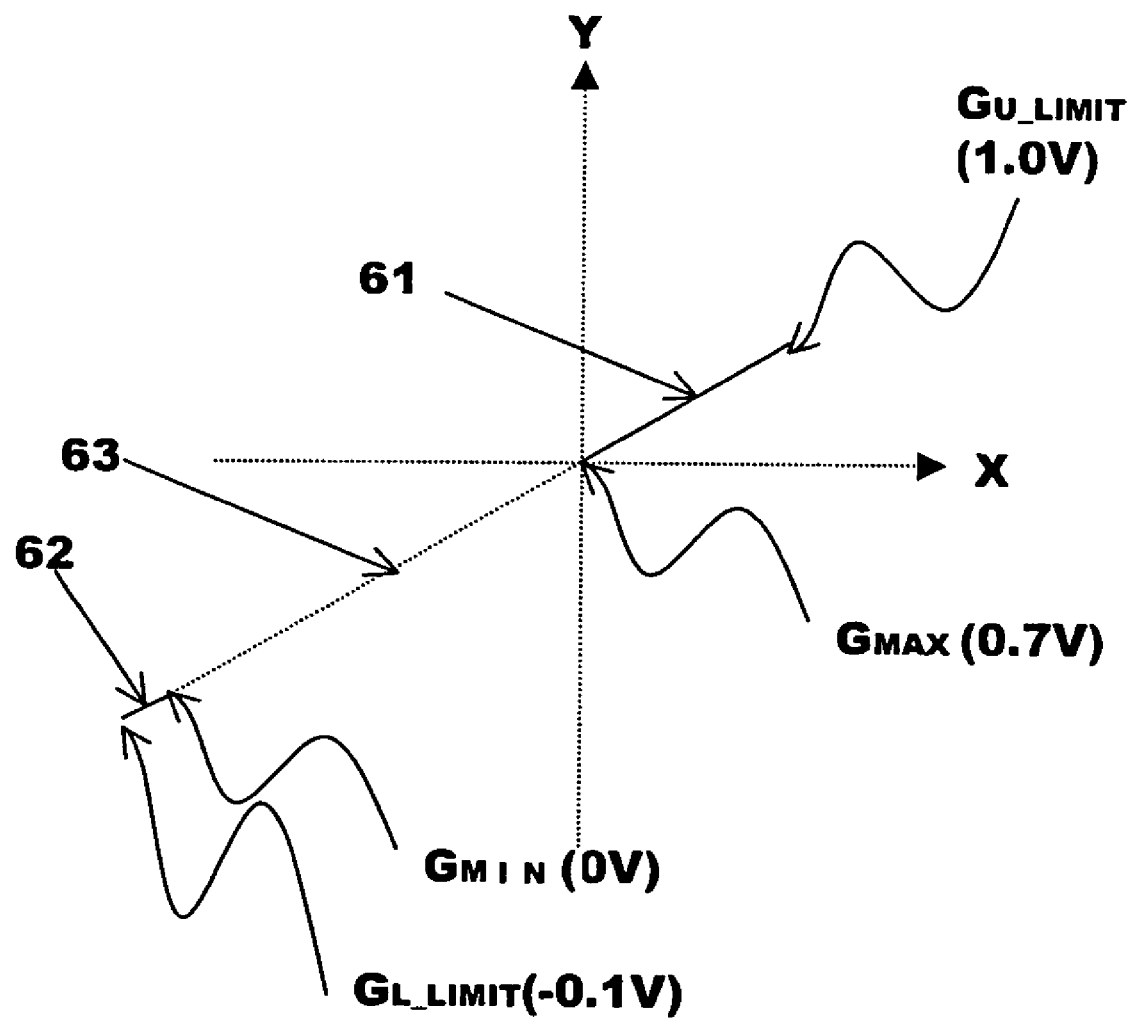
FIG. 6 is a diagram illustrating scale data on the G component.

As shown in FIG. 2, the video signal level display device 20 further comprises a scale data generating section 27. FIG. 6 is a diagram illustrating scale data (corresponding to the G component) calculated by the scale data generating section 27.

For the G component, the scale data generating section 27 sets the maximum effective value $G_{MAX}$ from the range setting section 25 as the origin. The scale data generating section 27 then calculates $(X_{G\_OUT1}, Y_{G\_OUT1})=(0, 0)$ to $(0, G_{U\_LIMIT}−G_{MAX})$ as a first group of effective out straight data. For the G component, the scale data generating section 27 calculates $(X_{G\_OUT1}, Y_{G\_OUT1})=(0, 0)$ to $((G_{U\_LIMIT}−G_{MAX}) \times (\sqrt{3})/2, (G_{U\_LIMIT}−G_{MAX})/2)$ (arrow 61) so as to rotate the first group of effective out straight data through −60°. In this case, the range setting section 25 sets the upper limit value $G_{U\_LIMIT}$ at, for example, 1.0 V.

Moreover, for the G component, the scale data generating section 27 calculates $(X_{G\_OUT2}, Y_{G\_OUT2})=(0, G_{L\_LIMIT}−G_{MAX})$ to $(0, G_{MIN}−G_{MAX})$ as a second group of effective out straight data. The scale data generating section 27 then calculates $(X_{G\_OUT2}, Y_{G\_OUT2})=((G_{L\_LIMIT}−G_{MAX}) \times (\sqrt{3})/2, (G_{L\_LIMIT}−G_{MAX})/2)$ to $((G_{MIN}−G_{MAX}) \times (\sqrt{3})/2, (G_{MIN}−G_{MAX})/2)$ (arrow 62) so as to rotate the second group of effective out straight data through −60°. In this case, the range setting section 25 sets the lower limit value $G_{L\_LIMIT}$ at, for example, −0.1 V.

Moreover, for the G component, the scale data generating section 27 calculates $(X_{G\_IN}, Y_{G\_IN})=(0, G_{MIN}−G_{MAX})$ to $(0, 0)$ as a group of effective straight data. The scale data generating section 27 then calculates $(X_{G\_IN}, Y_{G\_IN})= ((G_{MIN}−G_{MAX}) \times (\sqrt{3})/2, (G_{MIN}−G_{MAX})/2)$ to $(0, 0)$ (arrow 63) so as to rotate the group of effective straight data through −60°.

Figure 7:
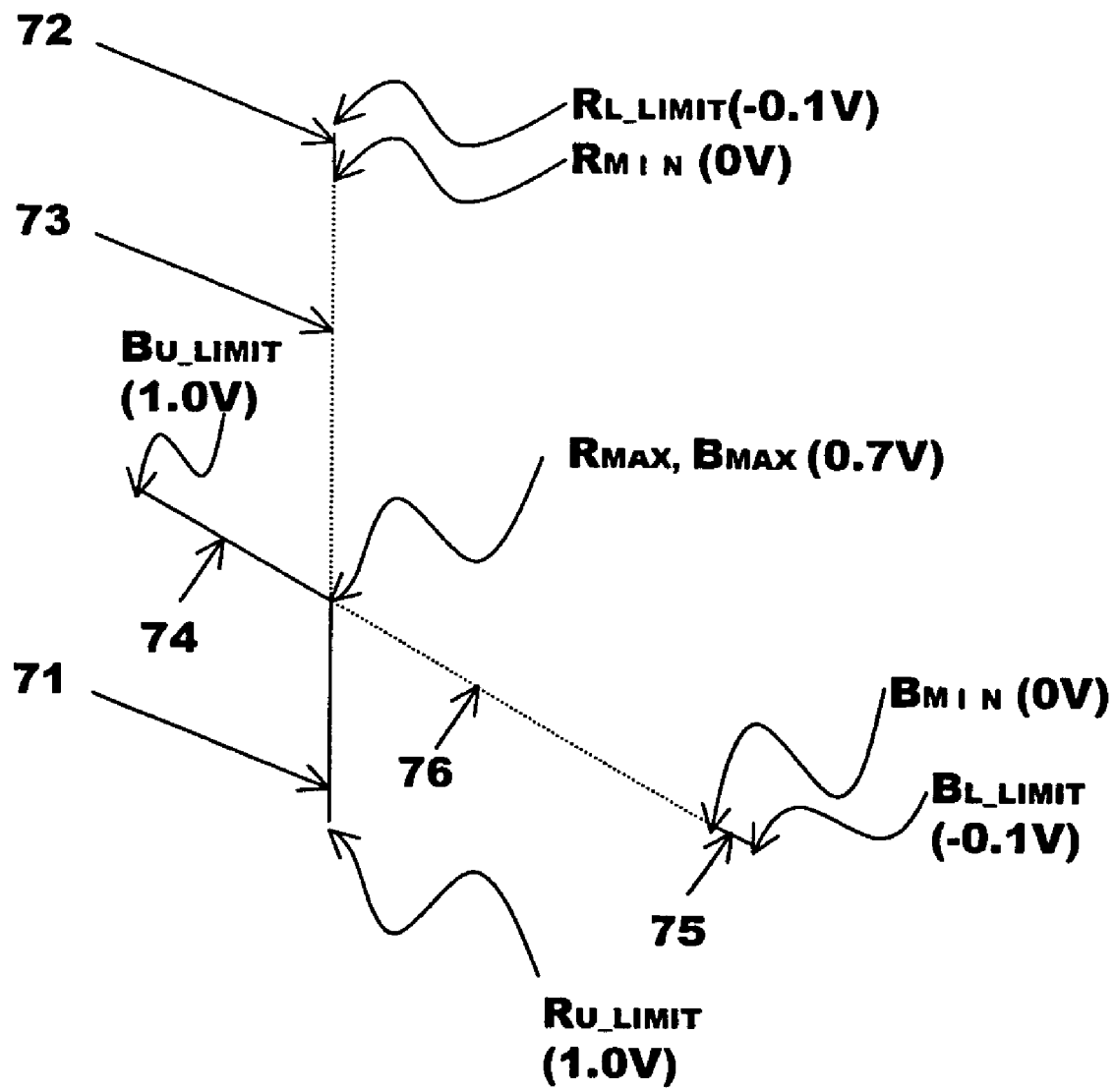
FIG. 7 is a diagram illustrating scale data on the R and B components.

FIG. 7 is a diagram illustrating the scale data (corresponding to the R and B components) calculated by the scale data generating section 27. Like the G component, for the R component, the coordinate calculating section 27 sets the maximum effective value $R_{MAX}$ from the range setting section 24 as the origin. The scale data generating section 27 then calculates $(X_{R\_OUT1}, Y_{R\_OUT1})=(0, 0)$ to $(0, R_{U\_LIMIT}−R_{MAX})$ as a first group of effective out straight data. For the R component, the scale data generating section 27 calculates $(X_{R\_OUT1}, Y_{R\_OUT1})=(0, 0)$ to $(0, −(R_{U\_LIMIT}−R_{MAX})$ (arrow 71) so as to rotate the first group of effective out straight data through 180°. In this case, $R_{U\_LIMIT}$ is, for example, 1.0 V and indicates an upper limit value of the R component.

Moreover, for the R component, the scale data generating section 27 calculates $(X_{R\_OUT2}, Y_{R\_OUT2})=(0, R_{L\_LIMIT}−R_{MAX})$ to $(0, R_{MIN}−R_{MAX})$ as a second group of effective out straight data. The scale data generating section 27 then calculates $(X_{R\_OUT2}, Y_{R\_OUT2})=(0, (R_{L\_LIMIT}−R_{MAX}))$ to $(0, −(R_{MIN}−R_{MAX}))$ (arrow 72) so as to rotate the second group of effective out straight data through +180°. In this case, $R_{L\_LIMIT}$ is, for example, −0.1 V and indicates a lower limit value of the R component.

Moreover, for the R component, the scale data generating section 27 calculates $(X_{R\_IN}, Y_{R\_IN})=(0, R_{MIN}−R_{MAX})$ to $(0, 0)$ as a group of effective straight data. The scale data generating section 27 then calculates $(X_{R\_IN}, Y_{R\_IN})=(0, −(R_{MIN}−R_{MAX}))$ to $(0, 0)$ (arrow 73) so as to rotate the group of effective straight data through +180°.

Like the R and G components, for the B component, the scale data generating section 27 sets the maximum effective value $B_{MAX}$ from the range setting section 26 as the origin. The scale data generating section 27 then calculates $(X_{B\_OUT1}, Y_{B\_OUT1})=(0, 0)$ to $(0, B_{U\_LIMIT}-B_{MAX})$ as a first group of effective out straight data. For the B component, the scale data generating section 27 calculates $(X_{B\_OUT1}, Y_{B\_OUT1})=(0, 0)$ to $(-(B_{U\_LIMIT}-B_{MAX})\times(\sqrt{3})/2, (B_{U\_LIMIT}-B_{MAX})/2)$ (arrow 74) so as to rotate the first group of effective out straight data through +60°. In this case, the upper limit value $B_{U\_LIMIT}$ is, for example, 1.0 V.

Moreover, for the B component, the scale data generating section 27 calculates $(X_{B\_OUT2}, Y_{B\_OUT2})=(0, B_{L\_LIMIT}-B_{MAX})$ to $(0, B_{MIN}-B_{MAX})$ as a second group of effective out straight data. The scale data generating section 27 then calculates $(X_{B\_OUT2}, Y_{B\_OUT2})=(-(B_{L\_LIMIT}-B_{MAX})\times(\sqrt{3})/2, (B_{L\_LIMIT}-B_{MAX})/2)$ to $(-(B_{MIN}-B_{MAX})\times(\sqrt{3})/2, (B_{MIN}-B_{MAX})/2)$ (arrow 75) so as to rotate the second group of effective out straight data through +60°. In this case, the lower limit value $B_{L\_LIMIT}$ is, for example, −0.1 V.

Moreover, for the B component, the scale data generating section 27 calculates $(X_{B\_IN}, Y_{B\_IN})=(0, B_{MIN}-B_{MAX})$ to $(0, 0)$ as a group of effective straight data. The scale data generating section 27 then calculates $(X_{B\_IN}, Y_{B\_IN})=(0, -(B_{MIN}-B_{MAX})\times(\sqrt{3})/2, (B_{MIN}-B_{MAX})/2)$ to $(0, 0)$ (arrow 76) so as to rotate the group of effective straight data through +60°.

Figure 8:
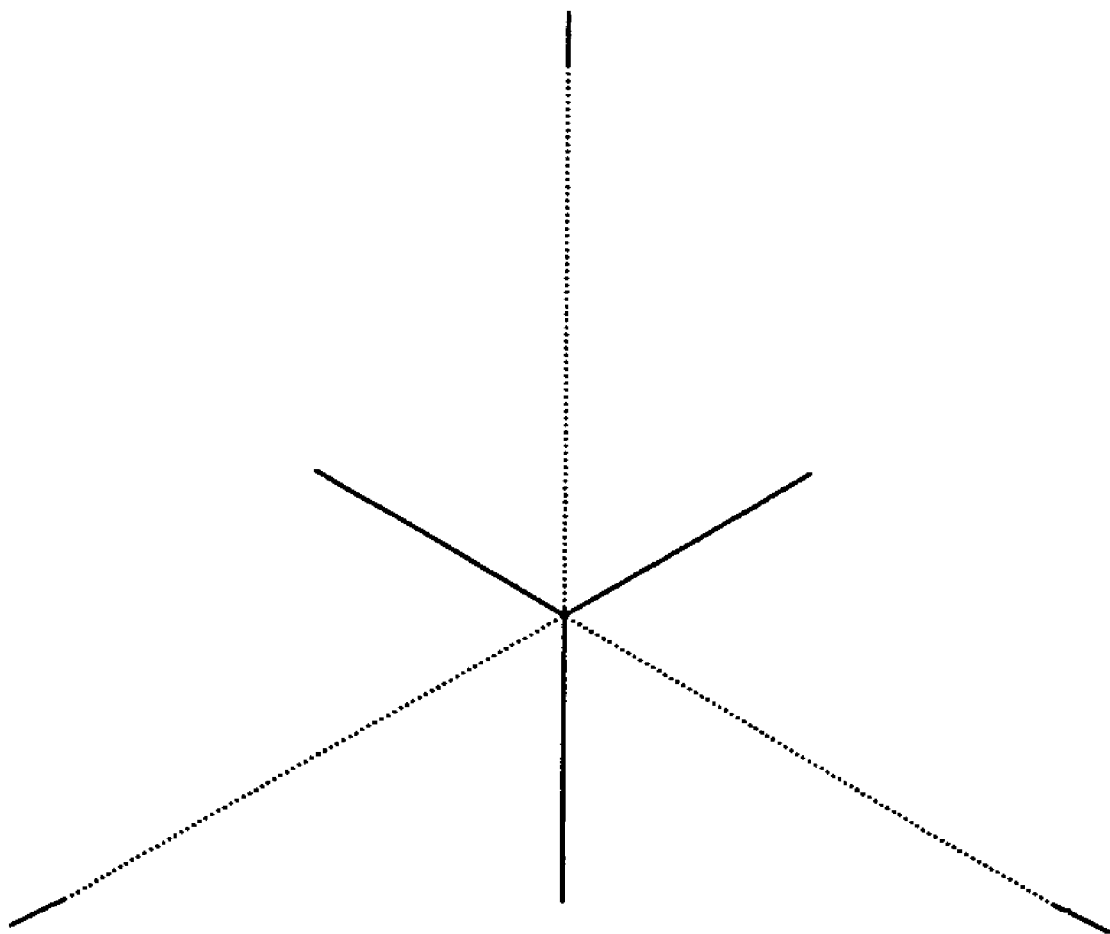
FIG. 8 is a diagram illustrating a scale display of the R, G, and B components.

As shown in FIG. 2, the video signal level display device 20 further comprises an image data converting section 28 and a color display section 29. The scale data generating section 27 inputs the first and second groups of effective out straight data of the R, G, and B components $((X_{R\_OUT1}, Y_{R\_OUT1}), (X_{G\_OUT1}, Y_{G\_OUT1}), (X_{B\_OUT1}, Y_{B\_OUT1}), (X_{R\_OUT2}, Y_{R\_OUT2}), (X_{G\_OUT2}, Y_{G\_OUT2})$ and $(X_{B\_OUT2}, Y_{B\_OUT2}))$ and the groups of effective straight data of the R, G, and B components $((X_{R\_IN}, Y_{R\_IN}), (X_{G\_IN}, Y_{G\_IN})$ and $(X_{B\_IN}, Y_{B\_IN}))$ to the image data converting section 28. The image data converting section 28 converts the first and second groups of effective out straight data as well as the group of effective straight data on the R, G, and B components into data required to drive the color display section 29. As a result, a scale such as the one shown in FIG. 8 is drawn on the color display section 29.

Preferably, the first and second groups of effective out straight data and the group of effective straight data which are drawn on the color display section 29 have different luminances. For example, the first and second groups of effective out straight data are drawn with a straight line having a 100% luminance, while the groups of effective straight data are drawn with a dotted line having a 100% luminance. Alternatively, the first and second groups of effective out straight data may be drawn with a straight line having a 100% luminance, while the groups of effective straight data may be drawn with a straight line having a 50% luminance.

Preferably, the first and second groups of effective out straight data and the group of effective straight data which are drawn on the color display section 29 are drawn in different colors. For example, the first and second groups of effective out straight data of the R component are drawn in white, while the group of effective straight data of the R component is drawn in red. Similarly, the first and second groups of effective out straight data of the G and B components are drawn in white, while the group of effective straight data of the G component is drawn in green and the group of effective straight data of the B component is drawn in blue.

Preferably, the groups of straight data on the R, G, and B components, respectively, drawn on the color display section 29 have different colors. More preferably, the groups of straight data (the first and second groups of effective out data and the group of effective straight data) of the R component drawn on the color display section 29 are drawn in red. More preferably, the groups of straight data of the G component drawn on the color display section 29 are drawn in green, while the groups of straight data on the B component are drawn in blue.

Figure 9:
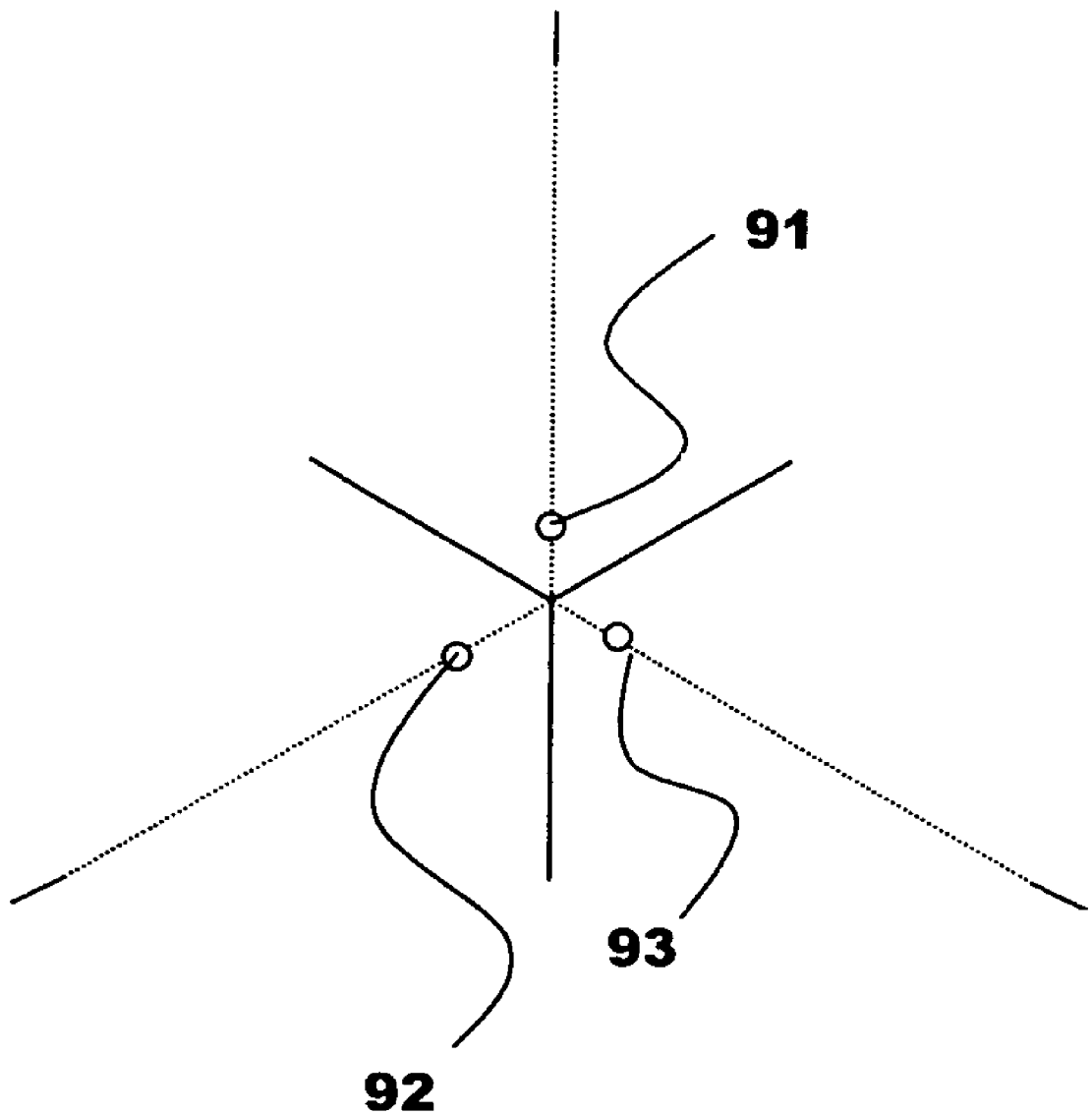
FIG. 9 is a diagram illustrating a level display of the R, G, and B components.

As shown in FIG. 2, the image data converting section 28 inputs the coordinates $((X_R, Y_R))$ of the R component from the coordinate calculating section 21. The image data converting section 28 inputs the coordinates $((X_G, Y_G))$ of the G component from the coordinate calculating section 22. The image data converting section 28 inputs the coordinates $((X_B, Y_B))$ of the B component from the coordinate calculating section 23. The image converting section 28 converts each of the R, G, and B components into driving data for the color display section 29. As a result, levels 91, 92, and 93 on a scale such as the one shown in FIG. 9 are drawn on the color display section 29.

Preferably, each of the R, G, and B components drawn on the color display section 29 is drawn with an identifying mark. For example, each of the R, G, and B components is drawn as an "o". Alternatively, each of the R, G, and B components may be drawn as an "x".

Preferably, the R, G, and B components drawn on the color display section 29 have different colors. More preferably, the R component drawn on the color display section 29 is drawn in red, the G component drawn on the color display section 29 is drawn in green, and the B component drawn on the color display section 29 is drawn in blue.

In this manner, the R, G, and B components of the RGB component signal are displayed together with their corresponding maximum effective values. Accordingly, the observer can determine directly from the level display of the R, G, and B components how each of the R, G, and B components approaches or exceeds the corresponding maximum effective value.

Further, the maximum effective values corresponding to the R, G, and B components, respectively, concentrate at one point. Accordingly, the observer has only to pay attention to that one point when observing whether or not the image is in a gammut error state. Specifically, the observer can recognize whether or not the image is in the gammut error state by comparing at least one of the R, G, and B components with the corresponding maximum effective value.

Moreover, the observer can recognize whether or not the gammut error state is attributed to the minimum effective value by comparing at least one of the R, G, and B components with the corresponding minimum effective value. The gammut error state attributed to the minimum effective value cannot be recognized using a conventional diamond display.

Furthermore, each of the R, G, and B components moves one-dimensionally on the straight scale. Accordingly, the level display of the R, G, and B components is clear.

Figure 10:
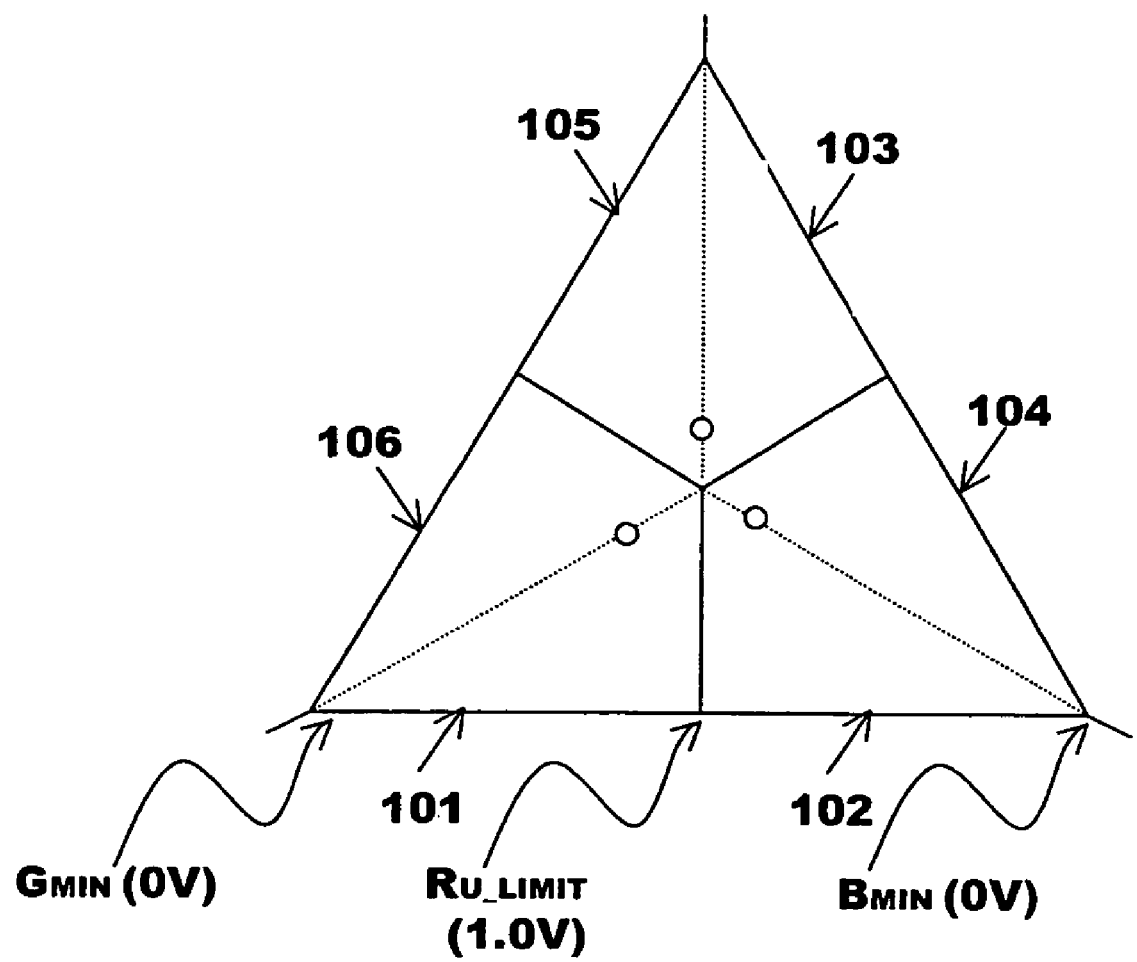
FIG. 10 is a diagram illustrating an auxiliary line display.

FIG. 10 shows an example of display shown in FIG. 9 and to which auxiliary lines are added. The auxiliary lines shown in FIG. 10 joins the upper limit value of each of the R, G, and B components of the RGB component signal to the minimum effective values of the two other components. Specifically, the auxiliary lines include straight lines 101 and 102 joining the upper limit value of the R component to the minimum effective values of the G and B components, straight lines 103 and 104 joining the upper limit value of the G component to the minimum effective values of the R and B components, and straight lines 105 and 106 joining the upper limit value of the B component to the minimum effective values of the R and G components. The scale data generating section 27 can generate groups of straight data corresponding to these straight lines 101 to 106.

The minimum effective value, maximum effective value, upper limit value, and lower limit value set by each of the range setting sections 24, 25, and 26 each have the same value for all the components. If each of the minimum effective value, maximum effective value, and upper limit values has the same value for all the components, the auxiliary lines shown in FIG. 10 show an equilateral triangle.

Figure 11:
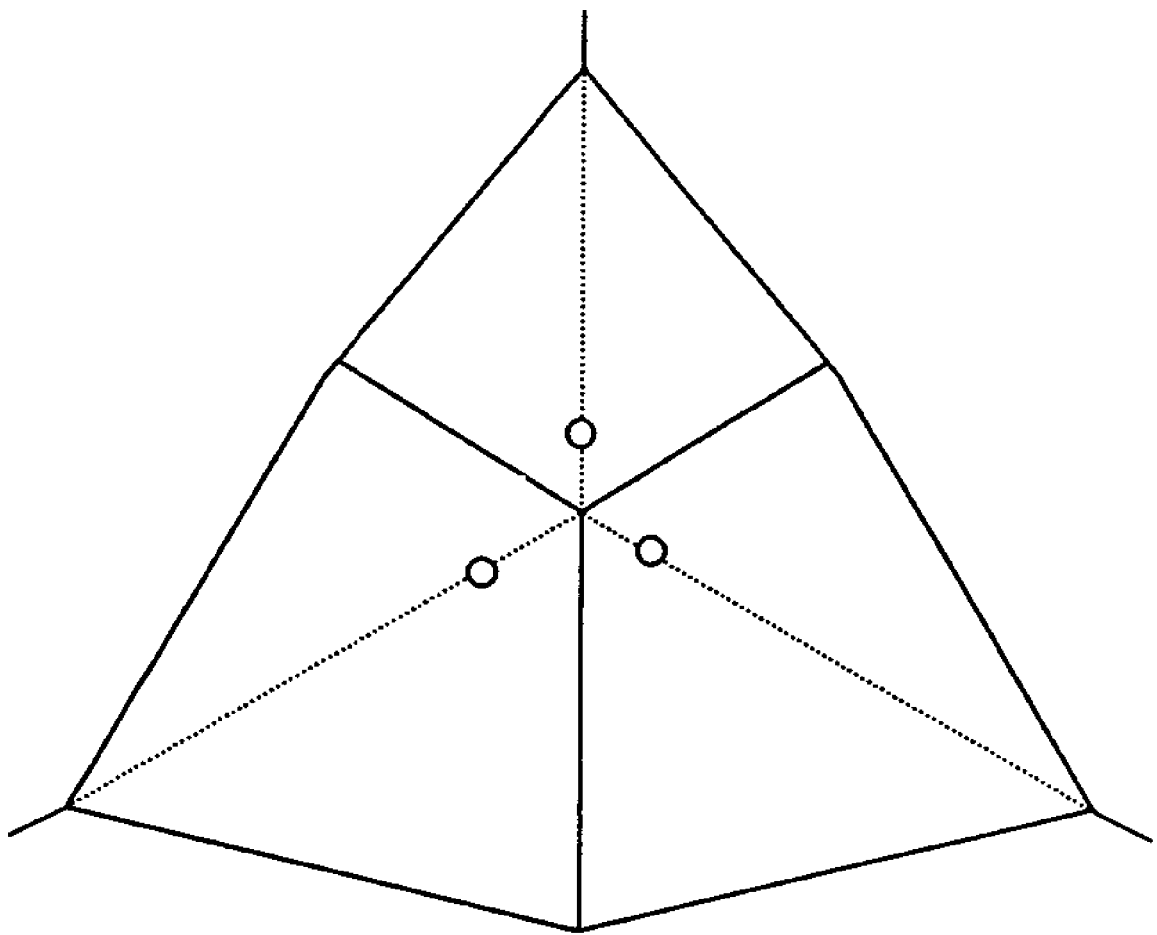
FIG. 11 is a diagram illustrating a variation of the auxiliary line display.

For example, if the video signal is adjusted in the subsequent edition stage, the minimum or maximum effective value must be changed. Specifically, for example, if only the R component is to be multiplied by +10% in the subsequent edition stage, the maximum effective value must be multiplied by −10%. If +0.5 V is to be added only to the R component, −0.5 V must be added to each of the minimum and maximum effective values. If at least one of the minimum and maximum effective values does not have the same value for all the components, the auxiliary lines shown in FIG. 10 do not show an equilateral triangle as shown in FIG. 11. (In FIG. 11, the maximum effective value RMAX=0.7 V×90%=0.63 V.)

Accordingly, the observer can understand that the minimum or maximum effective value has been changed by determining whether or not the figure composed of the auxiliary lines joins the maximum effective values of the R, G, and B components of the RGB component to the minimum effective values of the two other components.

Figure 12:
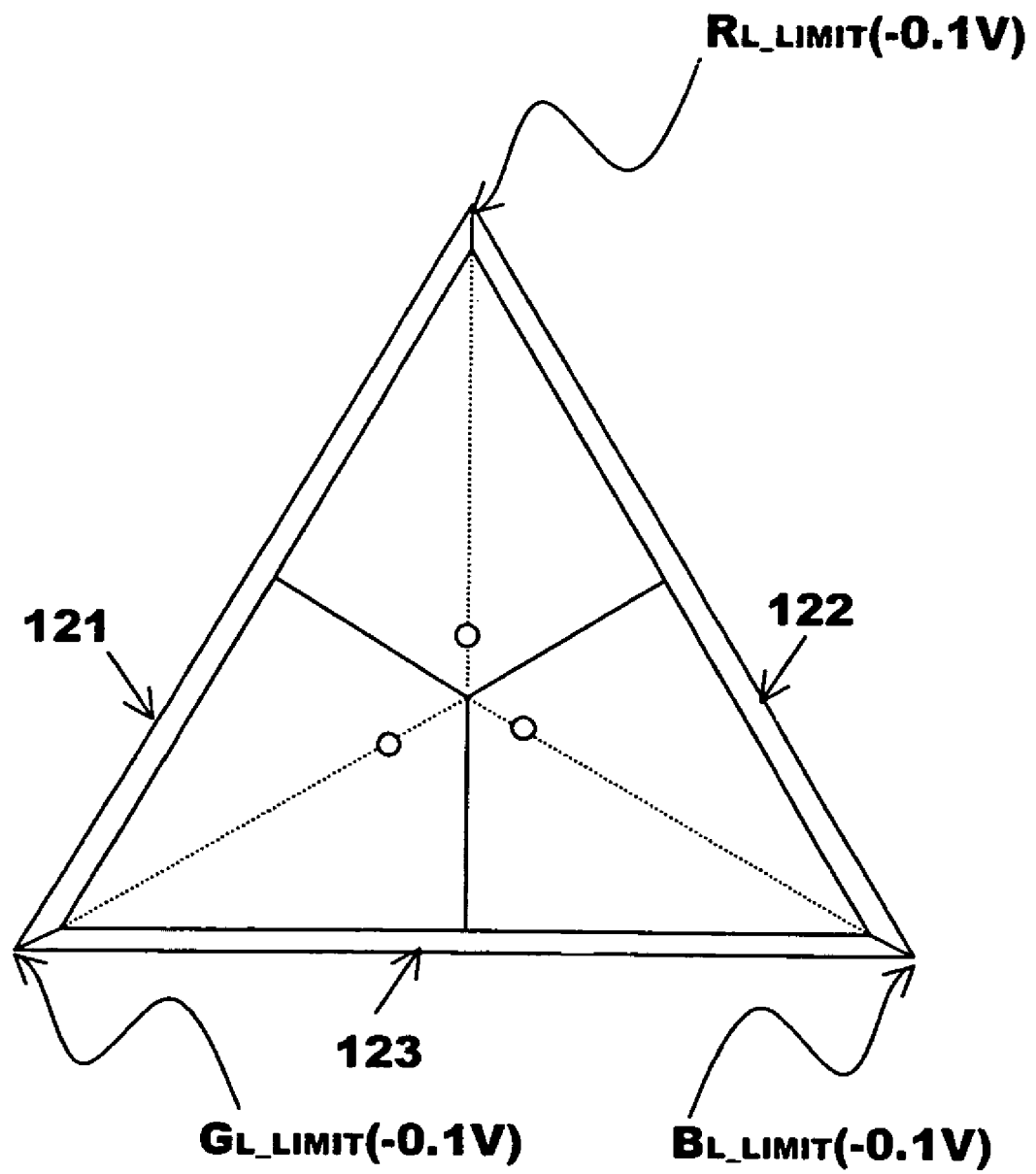
FIG. 12 is a diagram illustrating a second auxiliary line display.

FIG. 12 is the example of display shown in FIG. 10 and to which second auxiliary lines are added. The second auxiliary lines shown in FIG. 12 join the lower limit value of each of the R, G, and B components of the RGB component signal to the lower limit values of the two other components. Specifically, the second auxiliary lines include a straight line 121 joining the lower limit value of the R component to the lower limit value of the G component, a straight line 122 joining the lower limit value of the R component to the lower limit value of the B component, and a straight line 123 joining the lower limit value of the G component to the lower limit value of the B component. The scale data generating section 27 can generate groups of straight data corresponding to these straight lines 121 to 123.

Figure 13:
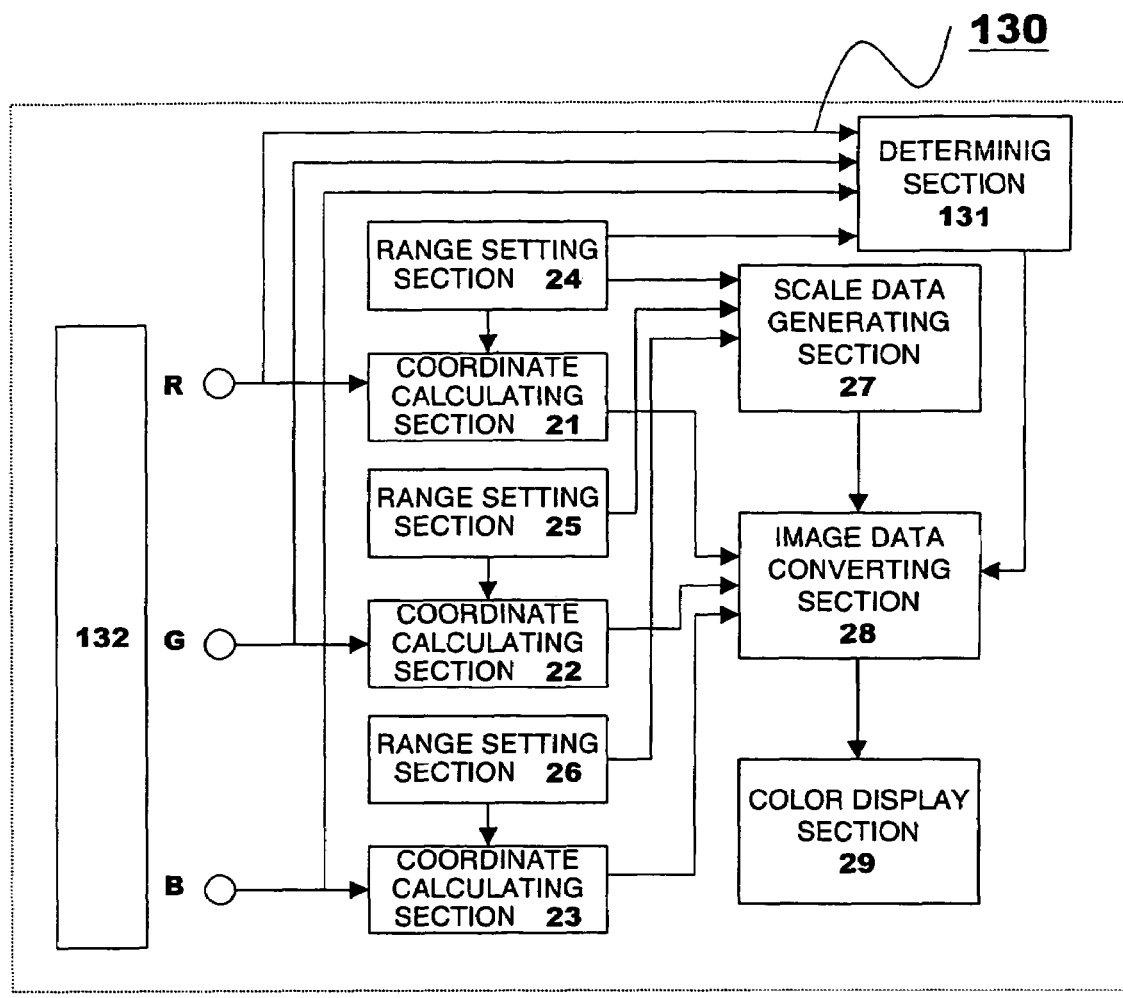
FIG. 13 is a block diagram of a video signal level display device comprising a gammut error automatic determining function.

FIG. 13 is a block diagram of a video signal level display device 130 comprising a gammut error automatic determining function. The video signal level display device 130 in FIG. 13 further comprises a determining section 131, compared to the video signal level display device in FIG. 2.

The R, G, and B components and the maximum and minimum effective values corresponding to the respective components are inputted to the determining section 131. The determining section 131 determines whether or not each of the R, G, and B components falls within the effective range between the maximum and minimum effective values corresponding to that component. The determining section 131 outputs, for example, a signal which corresponds to each of the R, G, and B components and which indicates that the image is in the gammut error state, to the image converting section 28.

On the basis of the result of the determination from the determining section 131, the image converting section 28 converts each of the R, G, and B components into driving data for the color display section 29. As a result, a level display indicating the gammut error state is different from a level display indicating a non-gammut error state. For example, a component in the gammut error state has a higher luminance than a component in the non-gammut error state. Alternatively, the component in the gammut error state is always displayed, while the component in the non-gammut error state is blinked.

In this manner, the gammut error state is automatically determined. Consequently, the observer can recognize whether or not the image is in the gammut error state without comparing at least one of the R, G, and B components with the corresponding maximum or minimum effective value.

This automatic determining technique is disclosed in Japanese Patent Laid-Open No. 62-239785.

Figure 14:
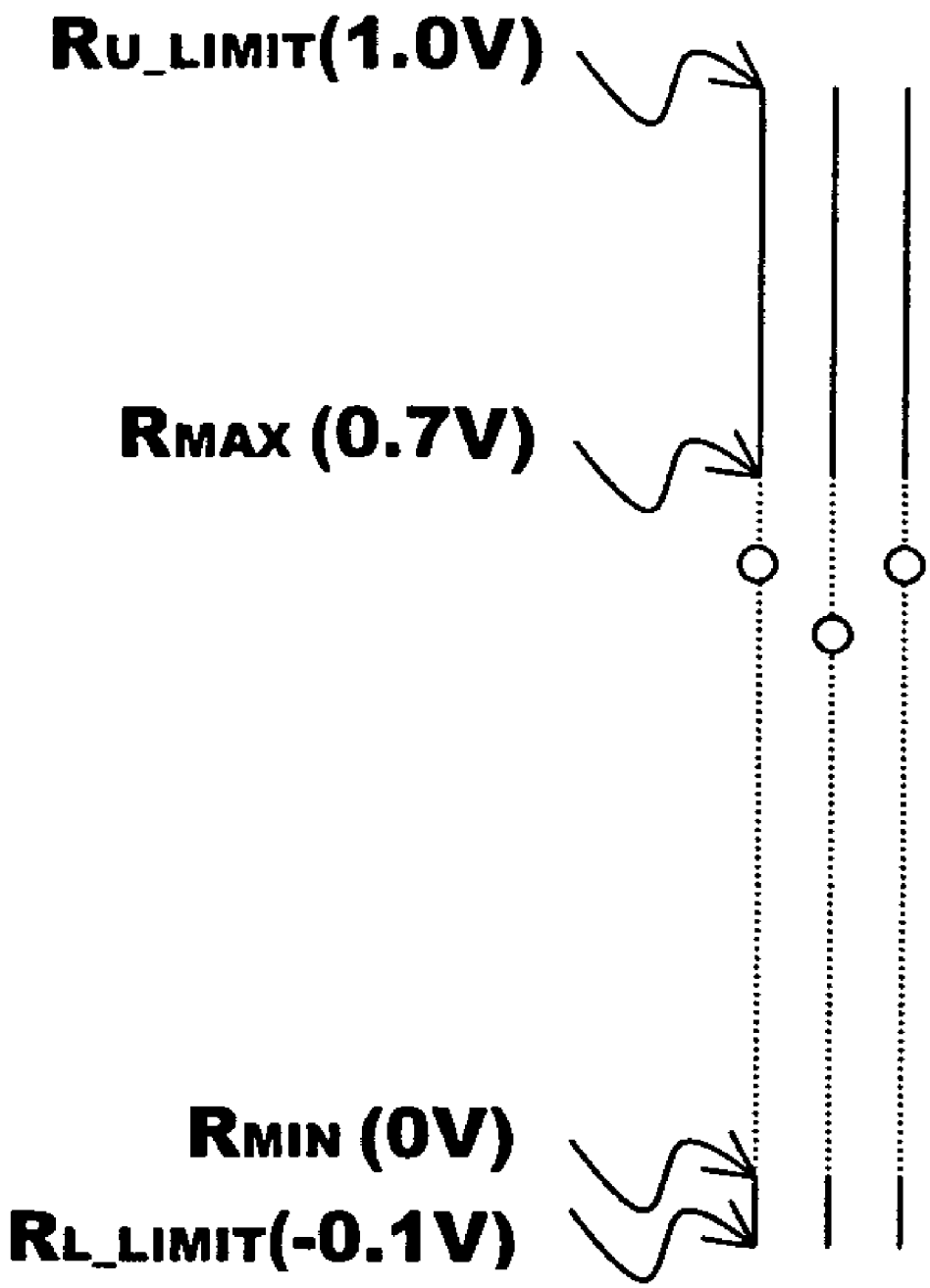
FIG. 14 is a diagram illustrating a level and scale display of the R, G, and B components.

The R, G, and B components of the RGB component signal are externally or internally inputted to the video signal level display devices 20 and 140 shown in FIGS. 2 and 14, respectively. For the external input, the R, G, and B components are inputted directly to the video signal level display devices 20 and 140. For the internal input, that is, if Y, Pr, and Pb components of a Y/color difference component signal are externally inputted, the video signal level display devices 20 and 140 comprise means (132) for converting the Y, Pr, and Pb components of the Y/color difference component signal into the R, G, and B components of the RGB component signal, to internally generate the R, G, and B components.

FIG. 14 shows an example of display on the color display section. As shown in FIG. 14, it is not necessary to rotatively display the R, G, and B components and the corresponding first and second groups of effective out straight data and group of effective straight data. In other words, the maximum effective values corresponding to the R, G, and B components need not necessarily concentrate at one point. When each component is displayed in bar graph form, the observer can determine directly from the level display of the R, G, and B components how each of the R, G, and B components approaches or exceeds the corresponding maximum or minimum effective value.

What is claimed is:

1. A video signal level display device comprising:
   means (24, 25, 26) for setting maximum effective values corresponding to R, G, and B components, respectively, of an RGB component signal;
   means (21, 22, 23) for calculating respective coordinates of the R, G, and B components so that the maximum effective values concentrate at one point; and
   means (29) for displaying the respective coordinates of the R, G, and B components.

2. The video signal level display device according to claim 1, wherein the R, G, and B components are displayed in different colors.

3. The video signal level display device according to claim 1, further comprising means (27) for generating straight scale data corresponding to the R, G, and B components, respectively, so that the maximum effective values concentrate at one point, and wherein
   the means (29) for displaying the coordinates displays respective straight scale data.

4. The video signal level display device according to claim 3, wherein the straight scale data corresponding to the R, G, and B components, respectively, are displayed in different colors.

5. The video signal level display device according to claim 3, wherein the straight scale data belonging to a range equal to or larger than the maximum effective value and the straight scale data belonging to a range smaller than the maximum effective value are displayed at different luminances.

6. The video signal level display device according to claim 3, wherein the straight scale data belonging to the range equal to or larger than the maximum effective value and the straight scale data belonging to the range smaller than the maximum effective value are displayed in different colors.

7. The video signal level display device according to claim 3, wherein the straight scale data belonging to the range equal to or larger than the maximum effective value is displayed by a solid line, and the straight scale data belonging to the range smaller than the maximum effective value is displayed by a dotted line.

8. The video signal level display device according to claim 3, wherein said means (24, 25, 26) for setting the maximum effective values further set minimum effective values corresponding to the R, G, and B components, respectively, and the straight scale data belonging to the range equal to or larger than the maximum effective value and straight scale data belonging to a range between the minimum effective value and the maximum effective value are displayed at different luminances.

9. The video signal level display device according to claim 3, wherein said means (24, 25, 26) for setting the maximum effective values further set minimum effective values corresponding to the R, G, and B components, respectively, and the straight scale data belonging to the range equal to or larger than the maximum effective value and straight scale data belonging to a range between the minimum effective value and the maximum effective value are displayed in different colors.

10. A video signal level display device comprising:

means (132) for converting Y, Pr, and Pb components of a Y/color difference component signal into R, G, and B components of an RGB component signal;

means (24, 25, 26) for setting maximum and minimum effective values corresponding to the R, G, and B components, respectively, of the RGB component signal;

means (21, 22, 23) for calculating respective coordinates of the R, G, and B components so that the maximum effective values concentrate at one point; and means (29) for displaying the coordinates of the R, G, and B components so that a component belonging to a range between the minimum effective value and the maximum effective value is distinguished from a component belonging to a different range.

11. The video signal level display device according to claim 10, wherein the R, G, and B components are displayed in different colors.

12. The video signal level display device according to claim 10, wherein the component belonging to the range between the minimum effective value and the maximum effective value and the component belonging to the different range are displayed at different luminances.

13. The video signal level display device according to claim 10, wherein the component belonging to the range between the minimum effective value and the maximum effective value and the component belonging to the different range are displayed in different colors.

14. A video signal level display device comprising:

means (24, 25, 26) for setting maximum effective values corresponding to R, G, and B components, respectively, of an RGB component signal;

means (21, 22, 23) for calculating respective coordinates of the R, G, and B components;

means (27) for generating straight scale data corresponding to the R, G, and B components, respectively; and means (29) for displaying the respective coordinates and straight scale data of the R, G, and B components.

* * * * *